(12) United States Patent
Kenny et al.

(10) Patent No.: US 10,088,658 B2
(45) Date of Patent: Oct. 2, 2018

(54) REFERENCING IN MULTI-ACQUISITION SLIDE IMAGING

(71) Applicant: General Electric Company, Schenectady, NY (US)

(72) Inventors: Kevin Bernard Kenny, Niskayuna, NY (US); Alex David Corwin, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1093 days.

(21) Appl. No.: 13/846,490

(22) Filed: Mar. 18, 2013

(65) Prior Publication Data

US 2014/0267671 A1    Sep. 18, 2014

(51) Int. Cl.
| | | |
|---|---|---|
| *G06K 9/32* | (2006.01) | |
| *G06T 3/00* | (2006.01) | |
| *G06T 3/40* | (2006.01) | |
| *G06T 3/60* | (2006.01) | |
| *G02B 21/26* | (2006.01) | |
| *G06T 7/00* | (2017.01) | |

(Continued)

(52) U.S. Cl.
CPC .......... *G02B 21/26* (2013.01); *G06K 9/3208* (2013.01); *G06T 3/0075* (2013.01); *G06T 3/40* (2013.01); *G06T 3/60* (2013.01); *G06T 7/0012* (2013.01)

(58) Field of Classification Search
CPC .... G02B 21/365; H04N 7/181; G01C 11/025; G06T 7/0012; G06K 9/00127; G06F 17/153
USPC .......... 348/79, 143, 144, 147; 382/128, 133, 382/276, 278, 280, 294
See application file for complete search history.

(56) References Cited

U.S. PATENT DOCUMENTS 5,850,486 A  * 12/1998 Maas et al. ................... 382/294
5,910,999 A     6/1999 Mukohzaka
6,266,452 B1 *  7/2001 McGuire ....................... 382/294
(Continued)

FOREIGN PATENT DOCUMENTS

| JP | 2004240931 A | 8/2004 |
|---|---|---|
| JP | 2010020997 A | 1/2010 |
| WO | WO 9853426 A1 * | 11/1998 |

OTHER PUBLICATIONS

International Search Report and Written Opinion issued in connection with corresponding PCT Application No. PCT/US2014/030970 dated Aug. 11, 2014.

(Continued)

*Primary Examiner* — Christopher S Kelley
*Assistant Examiner* — Kathleen Walsh
(74) *Attorney, Agent, or Firm* — GE Global Patent Operation; Pabitra Chakrabarti (57) ABSTRACT

Referencing of image acquired in multiple rounds of imaging is disclosed. In certain implementations, a baseline round of images are acquired and registered to one another to establish a global transformation matrix. In a subsequent round of image acquisition, a limited number of field of view images are initially acquired and registered to the corresponding baseline images to solve for translation, rotation, and scale. The full set of baseline images is then acquired for the subsequent round and each image is pre-rotated and pre-scaled based on the transform determined for the subset of images. The pre-rotated, pre-scaled images are then registered using a translation-only transform.

20 Claims, 8 Drawing Sheets

(51) Int. Cl.
*G06T 3/20* (2006.01)
*G02B 21/00* (2006.01)

(56) References Cited

U.S. PATENT DOCUMENTS

| | | | |
|---|---|---|---|
| 6,351,573 B1* | 2/2002 | Schneider | G06F 19/321 |
| | | | 382/128 |
| 6,373,970 B1* | 4/2002 | Dong et al. | 382/128 |
| 6,549,683 B1* | 4/2003 | Bergeron et al. | 382/298 |
| 7,359,563 B1* | 4/2008 | Dua et al. | 382/254 |
| 7,778,467 B2 | 8/2010 | Iizuka | |
| 7,778,485 B2* | 8/2010 | Zeineh | G02B 21/365 |
| | | | 382/284 |
| 7,853,098 B2* | 12/2010 | Hardy | G06T 7/0026 |
| | | | 382/280 |
| 7,856,154 B2* | 12/2010 | Young | 382/299 |
| 7,961,216 B2* | 6/2011 | Grindstaff et al. | 348/144 |
| 8,009,932 B2* | 8/2011 | Zhou et al. | 382/294 |
| 8,351,740 B2* | 1/2013 | Pham et al. | 382/294 |
| 8,369,600 B2* | 2/2013 | Can | G01N 1/312 |
| | | | 382/128 |
| 8,396,269 B2* | 3/2013 | Henderson et al. | 382/128 |
| 8,639,013 B2 | 1/2014 | Kenny | |
| 2002/0067409 A1* | 6/2002 | Harari et al. | 348/80 |
| 2002/0172410 A1 | 11/2002 | Shepard | |
| 2006/0028549 A1* | 2/2006 | Grindstaff | G01C 11/04 |
| | | | 348/144 |
| 2006/0098897 A1 | 5/2006 | Dewaele | |
| 2006/0159367 A1 | 7/2006 | Zeineh et al. | |
| 2006/0165267 A1* | 7/2006 | Wyman | G06T 7/0026 |
| | | | 382/128 |
| 2007/0269085 A1* | 11/2007 | Oshiro et al. | 382/128 |
| 2008/0063298 A1* | 3/2008 | Zhou et al. | 382/280 |
| 2008/0152207 A1* | 6/2008 | Micheva | G02B 21/367 |
| | | | 382/133 |
| 2008/0219503 A1* | 9/2008 | Di Venuto et al. | 382/103 |
| 2008/0292164 A1* | 11/2008 | Azar | A61B 5/0091 |
| | | | 382/131 |
| 2009/0060303 A1 | 3/2009 | Douglass et al. | |
| 2009/0245610 A1* | 10/2009 | Can | G01N 1/312 |
| | | | 382/133 |
| 2010/0215227 A1 | 8/2010 | Grunkin et al. | |
| 2010/0290678 A1* | 11/2010 | Dekel | G06T 5/003 |
| | | | 382/128 |
| 2011/0075914 A1* | 3/2011 | Filkins et al. | 382/133 |
| 2011/0090326 A1* | 4/2011 | Kenny et al. | 348/79 |
| 2011/0091125 A1* | 4/2011 | Kenny et al. | 382/254 |
| 2011/0115897 A1 | 5/2011 | Najmabadi et al. | |
| 2011/0235875 A1* | 9/2011 | Filkins et al. | 382/128 |
| 2011/0249876 A1 | 10/2011 | Dewaele | |
| 2011/0249910 A1* | 10/2011 | Henderson | G06K 9/00134 |
| | | | 382/278 |
| 2011/0268347 A1* | 11/2011 | Staker | G06K 9/32 |
| | | | 382/151 |
| 2011/0286654 A1* | 11/2011 | Krishnan | G06T 7/0083 |
| | | | 382/133 |
| 2012/0075457 A1 | 3/2012 | Soenksen | |
| 2012/0082362 A1* | 4/2012 | Diem et al. | 382/133 |
| 2012/0243797 A1* | 9/2012 | Di Venuto Dayer | |
| | | | G06K 9/00577 |
| | | | 382/218 |
| 2013/0016886 A1* | 1/2013 | Schoenmeyer | G06T 7/0012 |
| | | | 382/128 |
| 2013/0044933 A1* | 2/2013 | Kenny | 382/133 |
| 2013/0077891 A1* | 3/2013 | Nimnual et al. | 382/276 |
| 2013/0163896 A1* | 6/2013 | Chen et al. | 382/278 |
| 2015/0050650 A1 | 2/2015 | Seppo et al. | |
| 2015/0065371 A1 | 3/2015 | Seppo et al. | |

OTHER PUBLICATIONS

Reddy et al., "An FFT-Based Technique for Translation, Rotation, and Scale-Invariant Image Registration", IEEE Transactions on Image Processing, IEEE Service Center, vol. No. 5, Issue No. 8, pp. 1266-1271, Aug. 1996. XP011026046.

Glasbey et al., "A review of image-warping methods", Journal of Applied Statistics, Carfax Publishing Co. Abingdon, GB. vol. No. 25, Issue No. 2, pp. 155-171, 1998. XP 002570074.

Fitzpatrick et al., "Chapter 8 Image Registration", In: "Medical Image processing, vol. 2 of the Handbook of Medical Imaging", pp. 449-514, 2000. XP055089072.

Deshmukh et al., "A Survey of Image Registration", International Journal of Image Processing, vol. No. 5, Issue No. 3, pp. 245-269, Aug. 5, 2011. XP055132605.

Machine translation and Office Action issued in connection with corresponding JP Application No. 2016504327 dated May 29, 2018.

* cited by examiner

REFERENCING IN MULTI-ACQUISITION SLIDE IMAGING

BACKGROUND

The subject matter disclosed herein relates to the referencing of sets of slide images acquired in distinct acquisition operations.

For various physiological conditions, such as cancer, infectious diseases, physiological disorders, and so forth, detection and monitoring may be based, in part, on the analysis of a biological specimen from the patient. For example, a sample may be analyzed to detect the presence of abnormal numbers or types of cells and/or organisms that may be indicative of a disease or disorder. Various types of microscopy may be employed for such analysis. Further, various stains and staining protocols may be employed as part of this analysis to allow visualization of different structures, chemicals, or environments that might aid in detection or diagnosis of a disease or disorder.

To facilitate analysis of such pathology or histology samples, automated microscopy systems have been developed that automate various aspects of the image acquisition process. In particular, digital optical microscopes may be used in such automated systems and provide a digital image output for each acquisition. Certain such systems employ scanning microscopes where a sequence of displaced images are acquired and associated together (e.g., "tiled" or "stitched" together) to form a composite of the sample region of interest. For example, in the context of pathology and histology imaging operations, tissue sample slides may undergo imaging to acquire digital images of small adjacent or overlapping areas at high magnification and/or resolution. The adjacent or overlapping images may then be joined or associated to form a larger image that maybe navigated on a digital display device. In this manner, a composite or mosaic image of the sample may be generated, displayed, and navigated by a reviewer.

A complicating factor in the image generation and review process may be attributed to protocols where a sample undergoes multiple staining operations. In such instances, each staining step is associated with removing the slide from the microscope stage, treating the sample to remove any existing stain and applying the next stain, and replacing the slide on the microscope stage for imaging of the sample with the new stain. However, the act of removing and replacing the slide on the microscope stage generally results in the slide being at a slightly different position for each round of imaging. As a result, corresponding images from each round of imaging may not be aligned. Further the composite images generated for each round of imaging may also be misaligned with respect to one another. As a result, analyses or comparisons conducted using images acquired using different stains may be difficult or otherwise inhibited.

BRIEF DESCRIPTION

In one embodiment, a computer-implemented method for registering images is provided. In accordance with this method, a first set of images is acquired of a sample on a slide positioned on a stage. Each image is taken at a different field of view. A global transformation matrix is generated by registering the images of the first set to one another to form a composite image. A subset of images is acquired of the sample on the slide after the slide is removed from and replaced on the stage. The subset of images is less than the number of images in the first set. Each image of the subset is registered with a corresponding image of the first set of images to determine a translation, a rotation, and a scale factor. A second set of images is acquired of the sample at the same respective fields of view used to acquire the first set of images. Each image of the second set of images is rotated and scaled using the rotation and the scale factor determined for the subset of images. The rotated and scaled images of the second set are registered to the corresponding images of the first set.

In a further embodiment, an image analysis system is provided. The image analysis system comprises a memory storing one or more routines and a processing component configured to execute the one or more routines stored in the memory. The one or more routines, when executed by the processing component, cause acts to be performed comprising: performing an alignment operation between a limited set of images acquired of a sample and a previously acquired full set of images of the sample, wherein the alignment operation generates at least a rotation relating the limited set of images to corresponding images of the full set of images; rotating a subsequently acquired full set of images by the rotation; and translating the rotated images of the subsequently acquired full set of images to register the rotated images with corresponding images of the previously acquired full set of images.

In an additional embodiment, a digital microscopy imaging system is provided. The digital microscopy imaging system comprises: a stage configured to hold a slide; an objective and image sensor configured to acquire images of a portion of the slide, when present; a position controller configured to move one or both of the objective and the stage relative to one another in accordance with an imaging protocol; and a controller configured to control operation of one or both of the position controller and the image sensor. In addition, the digital microscopy imaging system comprises a memory storing one or more routines; and a processing component configured to execute the one or more routines stored in the memory. The one or more routines, when executed by the processing component, cause acts to be performed comprising: acquiring a first full set of images of at least a portion of the slide, wherein each image overlaps with at least one adjacent image; acquiring a second full set of images of at least the portion of the slide after the slide is remove from and replaced on the stage; rotating the images of the second full set of images by a predetermined angle to generate a set of pre-rotated images; and translating the pre-rotated images to register the pre-rotated images to corresponding images of the first full set of images.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed herein, in certain embodiments of the present approach, a set of images (e.g., baseline images) is acquired of a sample on a slide in an initial round of imaging. The set of baseline images is acquired with overlapping fields of view over a uniform grid of spatial locations. In one implementation, the field of view images are registered to one another using a translation-only Fast Fourier Transform (FFT). The result of the registration is used to establish a global transformation matrix mapping slide coordinates to image coordinates in both the individual fields of view and the composite (i.e., "stitched") canvas.

In a subsequent imaging round, such as after the sample has been stained with a different agent and the slide returned to the stage, the imaging system acquires imagery at a limited number of separate points (e.g., 2 or more, 3 or more, 4 or more, or 5 or more points). These separate images are registered to the corresponding baseline round field of view images, such as using a log-polar FFT, to solve for translation, rotation, and scale. In one implementation a least squares fit is used to generate a linear transform between centers of the respective field of view images in the baseline (i.e., initial imaging round) and the current imaging round. In one such embodiment, the transform is constrained to include only rotation, translation, and scale.

Once this limited set of images are acquired and processed to generate the linear transform, the entire grid of images for the current imaging round may be acquired. In one implementation, each respective field of view image acquired in the current imaging round is pre-rotated and pre-scaled based on the linear transform generated for the current imaging round. Corresponding baseline round field of view images are then registered to the pre-rotated, pre-scaled current round images, such as using a translation only FFT. The resulting transformation is composed with the pre-rotation and pre-scale to generate a mapping between slide coordinates and image coordinates in the current round of field of view images.

When a stitched or composite image is generated for a current imaging round, each field of view image is sampled according to its associated transform matrix. The resulting pixels lie in a common datum plane and, in certain embodiments, can be subtracted for autofluorescence removal, combined in a false-color image, used in common for statistical analysis, or displayed in an overlaid (i.e., superposed) fashion so that a reviewer can compare corresponding spatial locations.

Applying this approach in a pathology context allows the simultaneous display of multiple biomarkers in the same cells (as opposed to serial sections) without limiting the display to the size of the field of view of the microscope. Instead, imaging can be acquired and unified that is much larger than the field of view of the imager (e.g., microscope), up to and including the whole slide.

Figure 1:
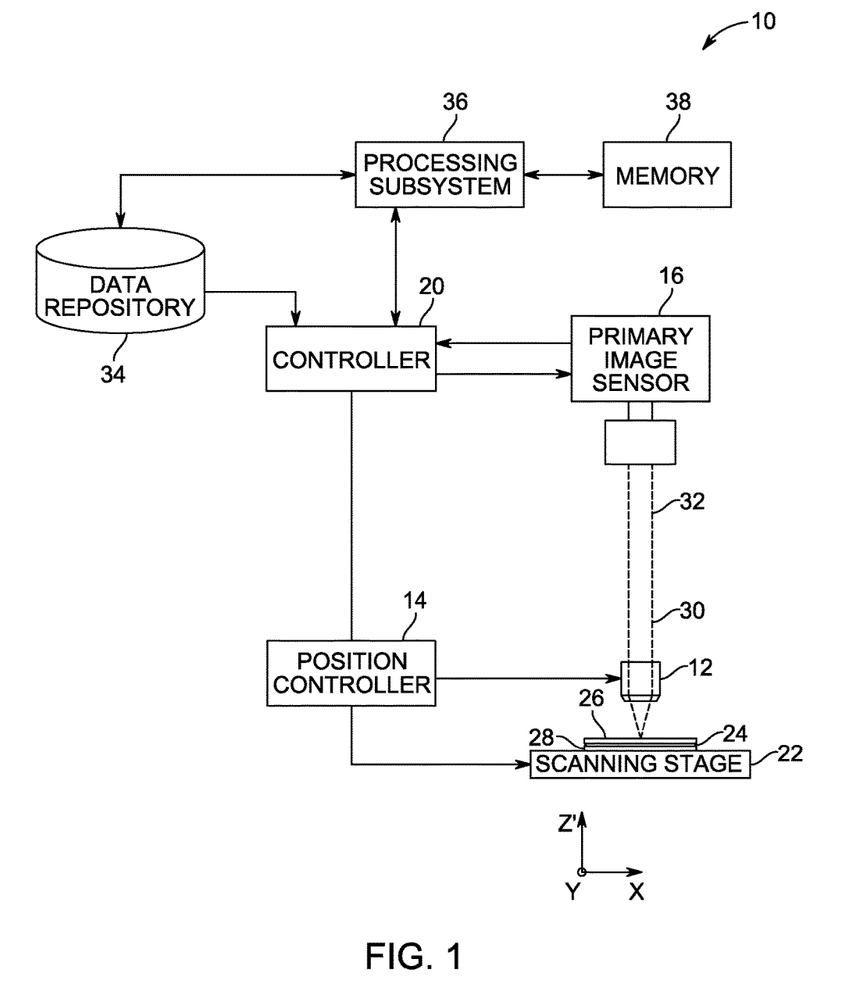
FIG. 1 is a block diagram of an imaging system, such as a digital optical microscope system, in accordance with aspects of the present disclosure.

With the preceding discussion in mind, FIG. 1 illustrates an embodiment of an imaging system 10, such as a digital optical microscope, that may be used in accordance with aspects of the present disclosure. The depicted imaging system 10 includes an objective lens 12, an image sensor 16, a controller 20 and a scanning stage 22. In the depicted embodiment, a sample 24 is disposed between a cover slip 26 and a slide 28. The sample 24, the cover slip 26, and the slide 28 positioned on the scanning stage 22. The cover slip 26 and the slide 28 may be made of a transparent material such as glass. In certain embodiments, the imaging system 10 may be part of an automated slide scanning system and may include an automatic slide feeder capable of feeding and loading slides for imaging one at a time from a magazine.

In certain embodiments, the sample 24 may be a biological sample, such as a tissue sample for analysis using pathology or histology techniques. In other instances, the sample 24 may be an industrial object, such as integrated circuit chips or microelectromechanical systems (MEMS). By way of example, such samples may have a thickness that averages from about 5 microns to about 7 microns and may vary by several microns. Examples of such samples may also have a lateral surface area of approximately 15 mm×15 mm.

In practice, the objective lens 12 is separated from the sample 24 along an optical axis in the Z (vertical) direction and has a focal plane in the X-Y plane coplanar with the slide 28. The objective lens 12 collects light 30 transmitted or reflected by the sample 24 at a particular field of view and directs the light 30 to an image sensor 16. As used herein, the term "light" encompasses any specified wavelength or range of wavelengths (i.e., spectrum) of interest for an imaging operation, whether visible to the human eye or otherwise. In one embodiment, the image sensor 16 generates one or more images of the sample 24 corresponding to a respective field of view at the time the image is acquired based on a primary light path 32. In certain embodiments, the image sensor 16 may be any suitable digital imaging device, such as a commercially available charge-coupled device (CCD) based image sensor.

The objective lens 12 employed in the system 10 may vary in magnification power based on considerations such as the application and the size of the sample features to be imaged. In one embodiment the objective lens 12 may be a high power objective lens providing a 20× or greater magnification and a having a numerical aperture of 0.5 or greater than 0.5 (small depth of focus). As will be appreciated, in other embodiments, the objective lens 12 may provide a different degree of magnification and/or may have a larger or smaller numerical aperture. By way of example, in one embodiment the objective lens 12 may be spaced from the sample 24 in the Z-direction by a distance ranging from about 200 microns to about a few millimeters and may collect light 30 from a field of view of 750μ×750μ, in the focal plane. As will be appreciated, depending on the application, the working distance, the field of view, and the focal plane may vary depending upon the configuration of the system 10 and/or the characteristics of the sample 24 to be imaged. Further, as discussed herein, in embodiments where aspects of the imaging process are automated, such as to allow sequential acquisition of multiple images with respect to a sample 24, the system 10 may include a position controller 14, such as a piezo actuator, to provide fine motor control and rapid small field of view adjustment to the objective 12 and/or to adjust the position of the slide 28 or the scanning stage 22 on which the slide 28 is positioned.

Depending on the imaging protocol or application, the imaging system 10 may illuminate the sample 24 using one or more of a wide variety of imaging modes, including bright field, phase contrast, differential interference contrast and fluorescence. Thus, the light 30 may be transmitted or reflected from the sample 24 in bright field, phase contrast or differential interference contrast applications, or the light 30 may be emitted from the sample 24 (fluorescently labeled or intrinsic) fluorescence imaging applications. Further, the light 30 may be provided using trans-illumination (where a light source and the objective lens 12 are on opposite sides of the sample 24) or epi-illumination (where a light source and the objective lens 12 are on the same side of the sample 24). Therefore, as will be appreciated, the imaging system 10 may include a light source (such as a high intensity LED or a mercury or xenon arc or metal halide lamp) in certain embodiments.

As noted above, in one embodiment the imaging system 10 may be configured as a high-speed imaging system. Such a high-speed system may be configured to rapidly capture a large number of digital images of the sample 24, each image corresponding to a particular field of view of the sample 24. In certain applications, the particular field of view associated with an image may be representative of only a limited fraction of the entire sample 24. Further, the respective fields of view associated with a sequence of images may be adjacent to one another or may overlap one another. In an example of such an embodiment, the slide 28 is imaged repeatedly in adjacent or overlapping areas or is passed in a scanning sweep through the image acquisition area, i.e., field of view. In one such embodiment, an image is acquired, the stage 22 is advanced in the X and Y direction to a position in which an adjacent or overlapping area is moved into the field of view, and another image is acquired.

Further, as discussed herein, a set of the digital images associated with a particular acquisition sequence (such as a series of images acquired while the sample 24 is stained with a given stain) may be digitally combined or stitched together to form a digital representation of the entire sample 24, i.e., a composite or mosaic image or canvas. In one embodiment, the imaging system 10 may store the plurality of acquired images, as well as any composite or mosaic images generated using the acquired images, in a data repository 34 and/or memory 38.

As depicted in the present embodiment, the imaging system 10 may also include an exemplary processing subsystem 36 that may facilitate the execution of an automated imaging protocol and/or the processing of image data acquired by the imaging system 10. For example, the processing subsystem 36 may be configured to synthesize a composite image based upon a series of acquired images and to perform a referencing or registration operation with respect to other images or composite images generated for the same sample 24, such as after the sample 24 has been stained with a different compound. The processing subsystem 36 may also communicate with a display device (i.e., a screen or monitor) to cause the display of the acquired images or a composite image generated using the acquired images. Although the memory 38 is shown as being separate from the processing subsystem 36 in the depicted example, in certain embodiments the processing subsystem 36 and memory 38 may be provided together, i.e., as a single or coextensive component. Additionally, although the present example depicts the processing subsystem 36 as being a separate component from the controller 20, in other embodiments, the processing subsystem 36 may be combined with the controller 20 or may function as the controller 20.

Further, it should also be appreciated that in certain embodiments the imaging system 10 may be used to determine a quantitative characteristic for the respective plurality of acquired images of the sample 24 captured at different times or imaging rounds or, otherwise, in different images. As used herein, a quantitative characteristic represents a quantitative measure of image quality and may also be referred to as a figure of merit. In particular, in certain embodiments such a figure of merit may be used in filtering features within the acquired images, as discussed herein. In one embodiment, the figure of merit may include a discrete approximation of a gradient vector. For example, in one embodiment, the figure of merit may include a discrete approximation of a gradient vector of an intensity of a particular channel (e.g., a green channel) with respect to a spatial position of the respective channel. Accordingly, in certain embodiments, the imaging system 10, or a suitable component of the imaging system 10 (such as the processing subsystem 36), may be configured to determine a figure of merit in the form of a discrete approximation to a gradient vector of an intensity of a color channel with respect to a spatial position of the respective color channel for each pixel in each of a plurality of acquired images. In certain embodiments, a low pass filter may be applied to the gradients to smooth out noise during the computation of the gradients. Although the example of a figure of merit described above is a discrete approximation of a gradient vector of an intensity of a color channel with respect to a spatial position of the respective color channel, use of other figures of merit is also contemplated. For example, other figures of merit may be based on a Laplacian filter, a Sobel filter, a Canny edge detector, an estimate of local image contrast, or any other suitable quantifiable context. In certain contexts, the figure of merit may be used as an indication of registration quality, and may thus be used to determine if a field of view image should be reacquired or if additional field of view images are needed to achieve an acceptable registration.

Figure 2:
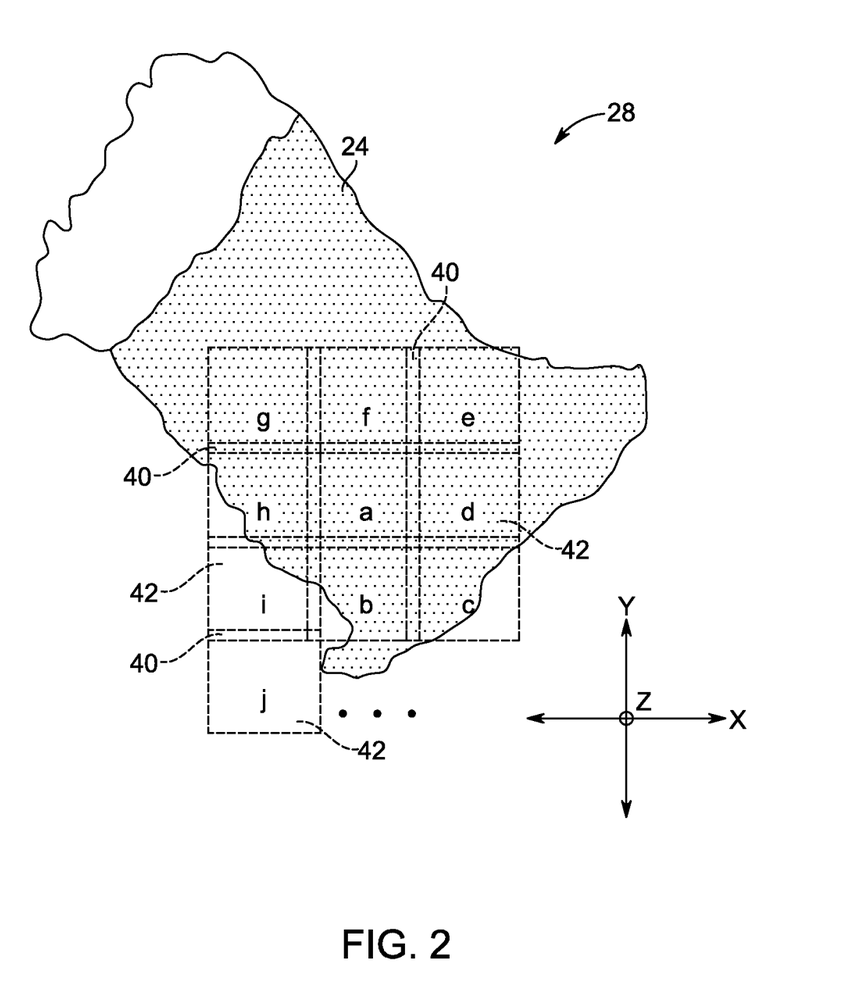
FIG. 2 is a plan view of a slide on which a sample is disposed with overlapping image areas where separate, overlapping field of view images may be acquired, in accordance with aspects of the present disclosure.

With the foregoing in mind, FIG. 2 depicts a sample 24 on a slide 28 undergoing an image acquisition using an imaging system 10 as discussed with respect to FIG. 1. In this example, a grid or array of images 42 are acquired for a set of overlapping fields of view, with each image 42 corresponding to a discrete image acquisition at a particular set of slide coordinates. Between each image acquisition, one or both of the slide 28 or the imaging objective are moved to allow image acquisition at the next slide location. In the example depicted in FIG. 2, the respective images 42 overlap one another at one or more edges 40. The overlapping at the edges 40 of the images 42 allows merging or stitching together of the images 42, as discussed herein, to generate a composite or mosaic image.

As noted herein, issues may arise in certain imaging contexts where the slide 28 is periodically removed from the scanning stage 22 and replaced as part of a multi-image acquisition protocol. By way of example, such issues may arise in histology or pathology contexts where a given sample 24 undergoes multiple staining operations, with images being acquired of the sample 24 after each application of a new stain or set of stains. For example, in applications where the spatial distribution of biomarkers is profiled in a biological sample, a multi-step process may be employed, as depicted in the flow chart 48 of FIG. 3. In such an example, a slide 28 having a sample 24 is initially stained (block 50) with one or more agents (such as one or more fluorescently labeled agents that label specific biomarkers).

Figure 3:
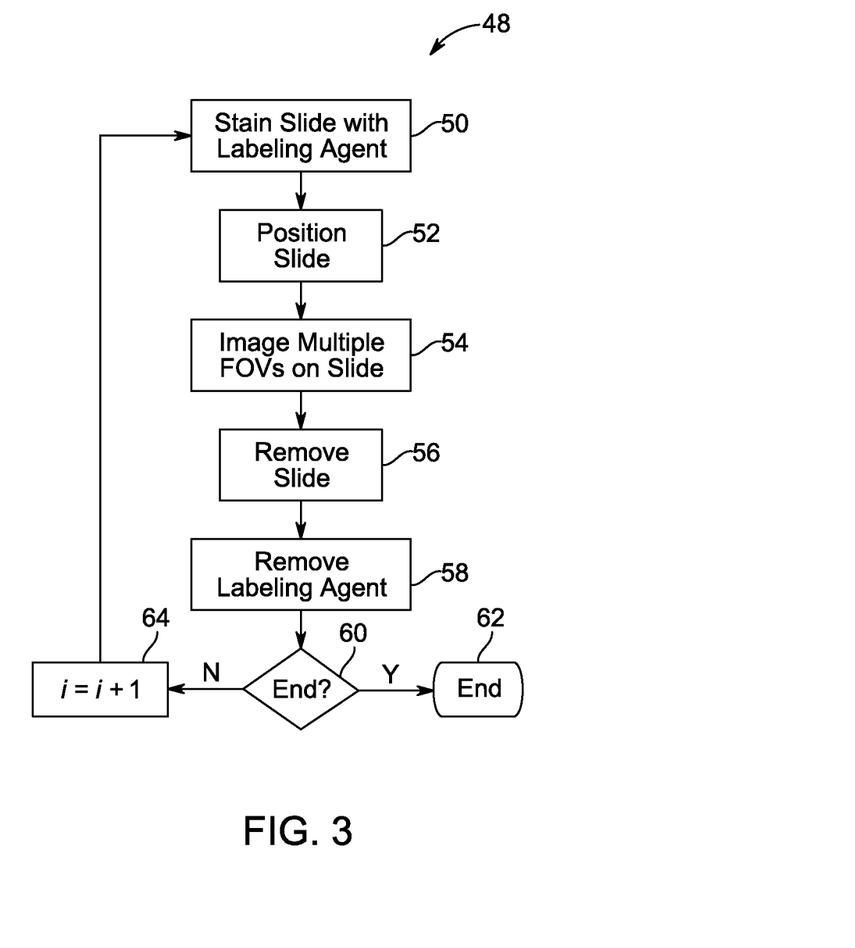
FIG. 3 depicts a flow diagram of steps associated with slide handling in an imaging protocol having multiple image acquisition rounds, in accordance with aspects of the present disclosure.

The slide 28 is then placed (block 52) on the stage 22 of the imaging system 10 and images 42 are acquired (block 54) at a plurality of different positions. In one embodiment, the acquired images 42 correspond to overlapping fields of view, such that the acquired images overlap by 5%, 10%, or some other suitable overlap region, as discussed herein. In this example, once the images 42 are acquired for the stain or stains associated with a current round of image acquisition, the slide 28 is removed (block 56) from the stage 22, a coverslip 26 (if present) is removed from the slide 28, and one or more of the stains present on the sample 24 are removed (block 58), such as by bleaching fluorescent labels from the sample. In certain implementations, a stain or agent may remain even after other stains are removed at step 58. In such implementations, the stain or agent that remains may be common to all image acquisition rounds and may be used as a common or reference stain between rounds of imaging. Further, in certain implementations, the coverslip 26 may be replaced on the slide 28 after removal of the stains (e.g., on the bleached sample) and reimaged to obtain images for auto-fluorescence removal.

If there are no more image acquisitions to be performed (block 60), the image acquisition process is ended (block 62). If, however, additional images 40 of the labeled sample 24 are to be acquired, the stain or stains to be used in the next round (block 64) of imaging (e.g., a different set of fluorescently labeled agents) are obtained and applied (block 50) to the sample 24. The newly labeled slide 28 is then replaced (block 52) on the stage 28 and the imaging process repeated. This image acquisition process may be repeated as many times as needed (e.g., 5, 10, 12, 15, or 20 times or as many times as needed), to obtain the desired profile of biomarkers.

As will be noted, one aspect of the aiming process described with respect to FIG. 3 is the removal and replacement of the slide 28 on the stage 22 of the imaging system 22. Each placement of the slide 28 on the stage 22 is subject to errors in the position and orientation of the slide 28 on the stage 22 which may be notable under magnification. As a result, a subsequent acquired image set maybe translated and/or rotated with respect to a previously acquired image set. The translation and/or rotation may also be combined with effects related to backlash and runout of the mechanical stage 22, tilt of the camera, and/or non-orthogonality of the stage axes.

Therefore, as discussed herein, to identify and display corresponding locations in composite or stitched images acquired as multiple fields of view, it may be useful to map both image sets to a common datum plane such that corresponding locations in the two (or more) image sets appear at the same point in the plane, thereby registering or referencing the multiple image sets.

Figure 4:
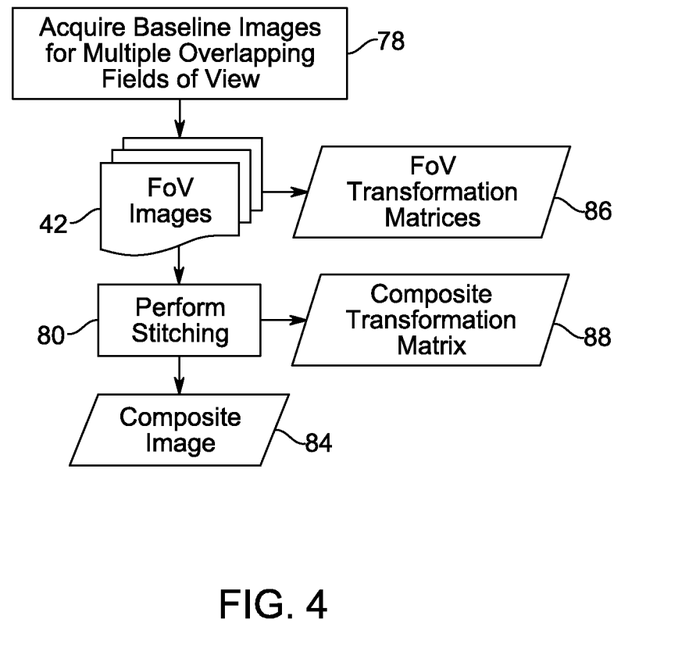
FIG. 4 depicts a flow diagram of steps associated with a baseline image acquisition round, in accordance with aspects of the present disclosure.

With this in mind, and turning to FIG. 4, in one implementation of the present approach, images 42 are acquired (block 78) for corresponding fields of view on a regular grid in a first round of imaging. In one embodiment, the images 42 are acquired such that the edges of adjacent images overlap with neighboring images by a substantial margin, such as between 5% and 20% of the field. In one embodiment, the images 42 of the fields of view may then be positioned relative to one another, taking into account only translation, by finding the displacements that maximize the zero-mean normalized cross power correlation between the overlapping regions of each image pair that overlaps.

Figure 5:
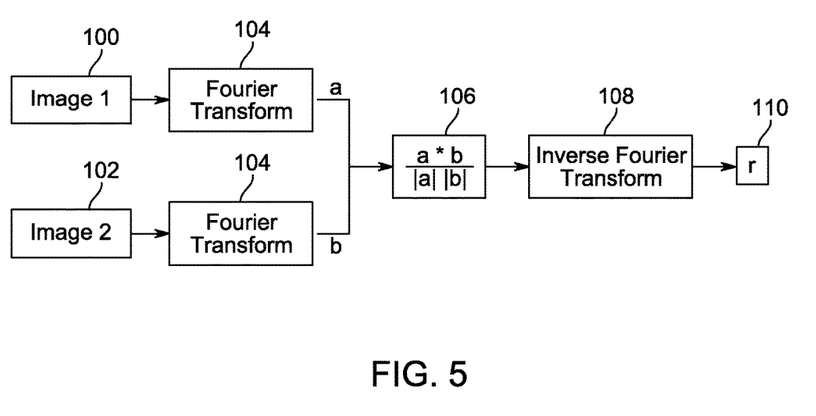
FIG. 5 depicts an approach for positioning adjacent images, in accordance with aspects of the present disclosure.

As depicted in FIG. 5, this may be done readily in the Fourier domain, where first and second overlapping images 100, 102 are separately Fourier transformed (block 104) to yield respective values a and b. The Fourier values a and b may be normalized (block 106) and the result inverse Fourier transformed (block 108) to yield the desired correlation r 110. The resulting value r 100 is a function of displacement in the x and y-directions and is maximized when the overlapping images 100, 102 are best correlated. Typically the value of r 100 exhibits a single sharp peak at the correct offset.

In one implementation, given these r 100 functions for a set of overlapping images 42, a heuristic approach may be employed to maximize the sum of correlations globally for the entire composite or mosaic image 84. For example, in one embodiment, an algorithm may be implemented as a greedy region-growing technique. However, in other embodiments, other techniques, such as trellis coding, successive over-relaxation, or simulated annealing, may be employed. Regardless of the technique employed, the images 42 of the initial imaging round are referenced to one another, allowing the images 42 of the initial round to be "stitched" together (block 80) to form the composite or stitched image 84.

As discussed herein, the coordinates of each image 42 in pixel space may be characterized by $(u_i, v_i)$, which may be mapped to coordinates in image canvas space (i.e., coordinates in the composite image 84) (U,V) as:

$$U = u_i + e_i \quad (1)$$

$$V = v_i + f_i \quad (2)$$

or $$[U \ V \ 1] = [u_i v_i \ 1] \begin{bmatrix} 1 & 0 & 0 \\ 0 & 1 & 0 \\ e_i & f_i & 1 \end{bmatrix} = [u_i v_i 1] B_i \quad (3)$$

It may also be convenient to translate the coordinates (U,V) in the composite image 84 to coordinates on the slide 28 in a conventional spatial measure or unit, such as millimeters (mm) To accomplish this, in one embodiment the imaging system 10 records the (x, y) position of the center of each imaged field of view. This center corresponds to pixel location $$\left(\frac{w-1}{2}, \frac{h-1}{2}\right)$$

in me respective acquired image 42 of the corresponding field of view, or $$\left(\frac{w-1}{2} + e_i, \frac{h-1}{2} + f_i\right)$$

in me composite image 84, where w is the width and h is the height of the respective images 42. Thus, at this point, a mapping is possible between spatial slide locations and pixel coordinates within one or both of the individual images 42 or a composite image 84 generated from the individual images 42.

Given this mapping for the acquired fields of view, a linear transformation can be solved where:

$$[U \ V \ 1] = [x \ y \ 1] C \quad (4)$$

And where:

$$C = \begin{bmatrix} c_{11} & c_{12} & 0 \\ c_{21} & c_{22} & 0 \\ c_{31} & c_{32} & 1 \end{bmatrix}. \quad (5)$$

In one implementation the linear transformation can be solved by the method of least squares. In such an implementation, the problem decomposes into two subproblems to be minimized:

$$\text{minimize} \|A\mathbb{p} - \mathbb{x}\|_2^2, \text{ where } \mathbb{x} = [c_{11}\ c_{21}\ c_{31}]^T, \quad (6)$$

and $$\text{minimize} \|A\mathbb{q} - \mathbb{y}\|_2^2, \text{ where } \mathbb{y} = [c_{12}\ c_{22}\ c_{32}]^T \quad (7)$$

where:

$$\mathbb{A} = \begin{bmatrix} x_1 & y_1 & 1 \\ x_2 & y_2 & 1 \\ & \vdots & \\ x_n & y_n & 1 \end{bmatrix} \quad (8)$$

$$\mathbb{x} = \begin{bmatrix} \frac{w-1}{2} + e_1 \\ \frac{w-1}{2} + e_2 \\ \vdots \\ \frac{w-1}{2} + e_n \end{bmatrix}, \text{ and} \quad (9)$$

$$\mathbb{y} = \begin{bmatrix} \frac{h-1}{2} + f_1 \\ \frac{h-1}{2} + f_2 \\ \vdots \\ \frac{h-1}{2} + f_n \end{bmatrix}. \quad (10)$$

As will be appreciated, since the matrix $\mathbb{A}$ is common to both subproblems, its factorization may only be computed once. By this approach, translation, rotation, the scale factor between the slide and image coordinates, and the shear resulting from non-orthogonality of the stage axes may be solved.

In certain circumstances, the centers of the acquired field of view images 42 may be collinear, i.e., line on a common line. In such circumstances the matrix $\mathbb{A}$ will be rank deficient and the algorithm will be unable to solve for shear. In one embodiment, the algorithm may, in such circumstances, employ an alternative formulation:

$$\begin{bmatrix} c_{11} & c_{12} & 0 \\ -c_{12} & c_{11} & 0 \\ c_{31} & c_{32} & 1 \end{bmatrix} \quad (11)$$

giving the least squares problem:

$$\text{minimize} \|\mathbb{A}\mathbb{x} - \mathbb{b}\|_2^2, \text{ where } \mathbb{x} = [c_{11}, c_{12}, c_{31}, c_{32}]^T \quad (12)$$

where $$\mathbb{A} = \begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ & \vdots & & \\ x_n & -y_n & 1 & 0 \\ y_n & x_n & 0 & 1 \end{bmatrix}, \text{ and} \quad (13)$$

$$\mathbb{b} = \begin{bmatrix} U_1 + (w-1)/2 \\ V_1 + (h-1)/2 \\ U_2 + (w-1)/2 \\ V_2 + (h-1)/2 \\ \vdots \\ U_n + (w-1)/2 \\ V_n + (h-1)/2 \end{bmatrix} \quad (14)$$

which will be full rank if all (x, y) pairs are distinct.

Thus, in this manner, an initial set of baseline field of view images 42 maybe acquired and stitched together to form a composite image 84, with respective transformation matrices being calculated during the process. For example, in practice an automated image acquisition scan may be controlled by a desktop or other computer that also computes the correlation between field of view images concurrent with the image acquisition operation. Respective matrices 86 may be defined that allow transformations between the slide coordinates and field of view image pixels and a matrix 88 may be defined that allows transformations between the slide coordinates and the composite image pixels. The matrices may be employed, either individually or in some combined or composite form, to allow between field of view image space, composite image space, and the slide coordinates. In addition, during baseline imaging suitable image metrics may be acquired for each field of view image to facilitate identification of overshoot regions in subsequent imaging rounds.

In subsequent rounds, the sample 24, as noted above, may be stained with one or more different agents, such as fluorescent agents that label specific biomarkers. Images 42 may be acquired at particular fields of view of the newly stained sample 24.

With this in mind, in certain embodiments there is one imaging channel that is constant through all rounds of imaging, thus serving as a common or constant feature in each round of imaging and facilitating comparison between rounds. In such an implementation, the imaging channel that is constant between rounds is the one used in the registration process. For example, in one embodiment the channel used for registration is a nucleic acid stain (such as DAPI or Höchst) which persists after the bleaching steps or which is periodically reapplied. Other alternatives include, but are not limited to, a non-specific acid stain (such as fluoroscein, FITC or eosin), a non-specific label of primary amines (such as epicocconone), or the native auto-fluorescence of the tissue itself.

In certain implementations, it may be desirable to maximize the overlap between the field of view images 42 captured in subsequent imaging rounds and those captured in the initial or baseline imaging round. To facilitate this goal, in certain implementations a linear mapping is established that takes a set of stage coordinates from the initial or baseline imaging round and maps those coordinates to the same or corresponding position in the subsequent imaging round. In practice, it may be assumed that the slide placement in the subsequent round can be controlled well enough that the uncertainty in position is less than the size of the field of view. For example, it may be assumed that slide position can be replicated within one-third of a field of view of the imaging system.

This may be accomplished, in certain embodiments, by acquiring field of view images 42 in a current image acquisition round and registering the respective field of view images 42 in the current round to the corresponding field of view images 42 from the baseline or initial round. In one embodiment, the registration algorithm is tolerant of rotation as well as translation. In one such example, the algorithm reads out a rotation angle θ, a scale factor s, and a translation (Δu, Δv) which, when composed, map a respective baseline field of view image to the corresponding locations in the current field of view image. Because the returned rotation and scale may be generated over a relatively short baseline, in certain implementations these values may be ignored or discarded.

Figure 8:
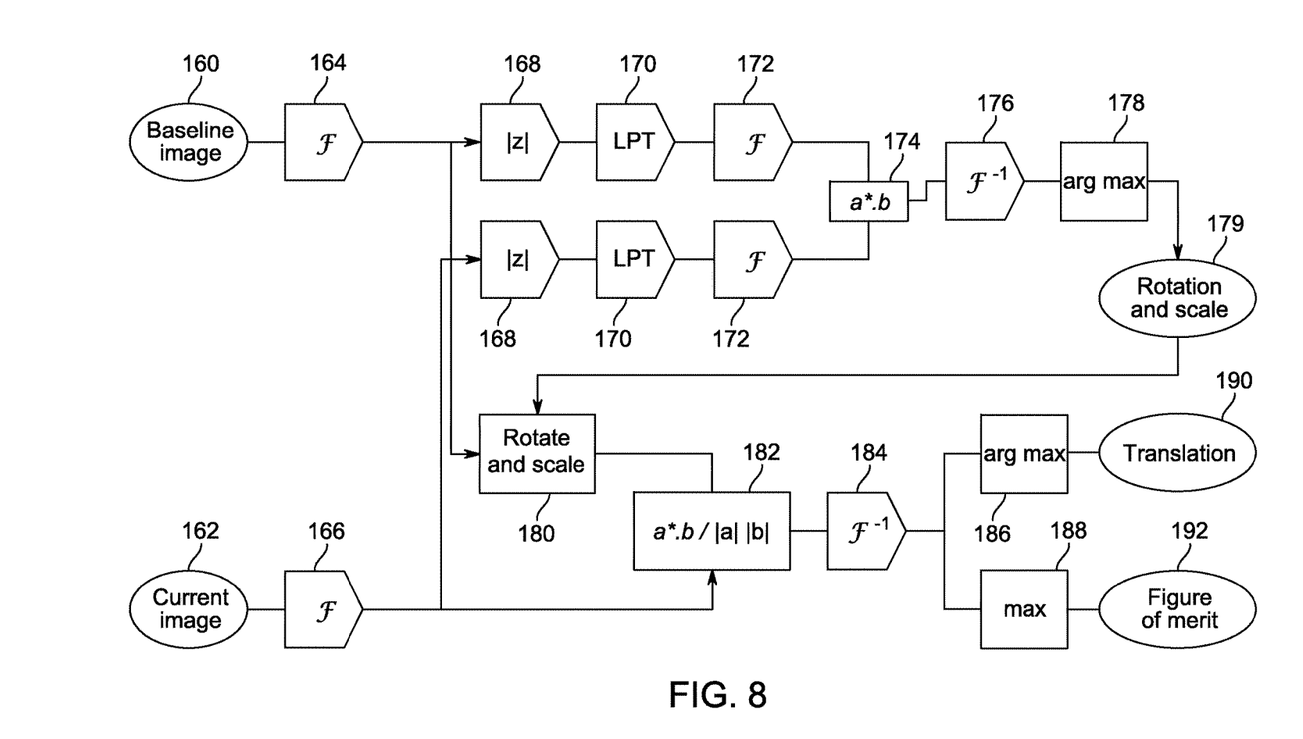
FIG. 8 depicts an approach for aligning successive images of the same field of view, in accordance with aspects of the present disclosure.

By way of example, the rotation angle, scale factor, and translation may be obtained, in some embodiments, by the calculation depicted in FIG. 8. In this example, the baseline image 160 of a given field of view and the corresponding current image 162 of the same field of view are separately Fourier transformed (block 164, block 166) to yield frequency domain images. In an initial calculation to determine rotation and scale, the amplitudes of both Fourier transformed images are extracted component by component (block 168), the resulting real images are subjected to the log-polar transformation (blocks 170), and the log-polar images are Fourier-transformed (blocks 172) separately. The resulting images are multiplied (block 174) component by component, and subjected to an inverse Fourier transform (block 176), yielding a real image whose coordinate axes are rotation and log(scale), and whose values are correlations achieved at the given rotation and scale. The algorithm extracts (block 178) the rotation and scale 179 that maximizes the correlation (constraining the values to ones that are physically reasonable).

In a second phase, the algorithm rotates and scales (block 180) the Fourier transform of the baseline image 160 by the computed amounts [or in another embodiment, rotates the Fourier transform of the current image 162 by the negative amount and scales it by the reciprocal amount], yielding a pre-rotated and pre-scaled frequency domain image. Translation is then computed using an identical algorithm to that in FIG. 5, wherein the cross-power correlation is computed in the frequency domain (block 182). The resulting image is inverse transformed (block 184), and the maximum of the correlation function located (blocks 186, 188). The argument of the maximum 190 gives the number of pixels that the image must be translated, and the maximum value 192 is an indicator of the quality of the registration With the foregoing generalized overview and example in mind, in one embodiment, the algorithm acquires the displacements Δu and Δv at a plurality of points (e.g., 2, 3, 4, 5, 7, 10, or any other suitable number of points), where each point corresponds to a point (e.g., the center point) within a field of view image 42. In one example, the separation of points is maximized, to the extent feasible, along the axes. By way of example, and turning to FIG. 6, in one implementation five points may be selected, such as at: (a) the field of view having the best image quality in the baseline or initial round of imaging (if this point does not yield an adequate correlation, select the next-best correlation), (b) the point at the greatest Euclidean distance from point (a) and having an adequate image quality in the initial or baseline round (if this point does not yield an adequate correlation, select the next-furthest), (c) the point whose orthogonal projection onto the line 120 joining points (a) and (b) is as long as possible (if correlation is inadequate, go to the next-best), (d) the point that is as far to the left of the line 122 joining points (b) and (c) as possible (if correlation is inadequate, go to the next-best), and (e) the point that is as far to the right of the line 122 joining points (b) and (c) as possible (if correlation is inadequate, go to the next-best). In such an implementation, points (b)-(c) achieve the greatest separation possible on one axis (i.e., line 122), and points (d)-(e) achieve the greatest separation on another axis normal to the first. In practice, two points may actually be sufficient to determine the translation and rotation of the slide 28, and any number of points greater than two may allow overdetermination of the rotation and translation solution.

Figure 6:
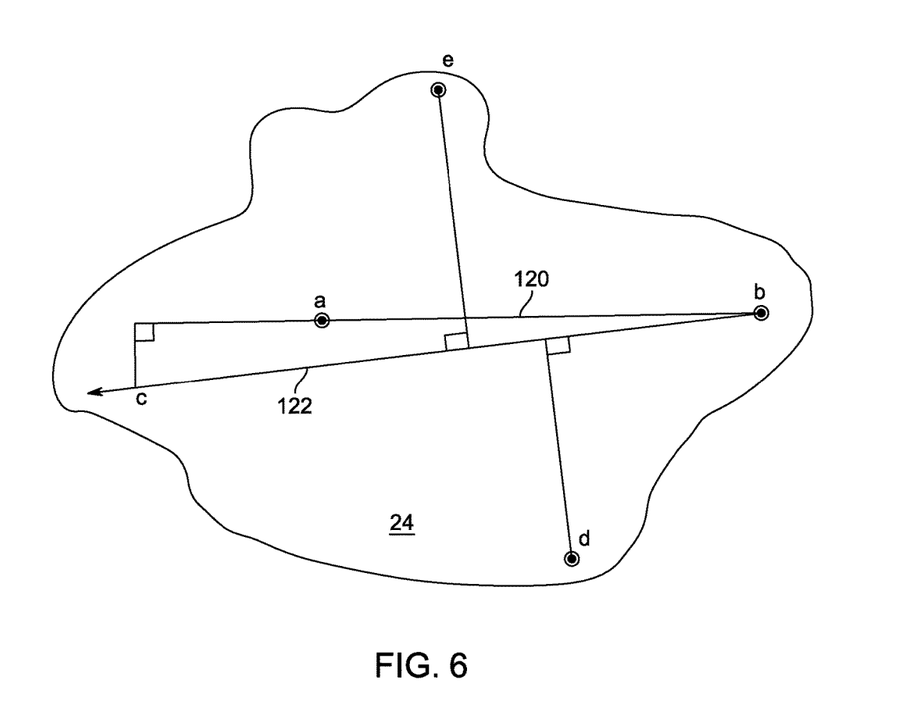
FIG. 6 depicts an example of a sample on which various points are identified for acquiring a subset of field of view images of the sample.

With respect to the image quality determinations noted in the preceding discussion, in operation image quality may be quantitatively assessed using a suitable measure, such as Brenner's gradient, and a threshold or cutoff criteria. For example, "adequate" image quality may be specified as having a Brenner gradient at least 0.1 times that of the field of view of point (a), in the above example. Similarly, the determination that two points are "adequately" or "sufficiently" registered may be based on a quantitative and thresholded basis. For example, "adequate" registration may be defined operationally as the two registered points in question yielding a zero-mean normalized cross-power correlation coefficient of at least 0.005. As will be appreciated, other suitable metrics and/or thresholds may be employed.

Figure 7:
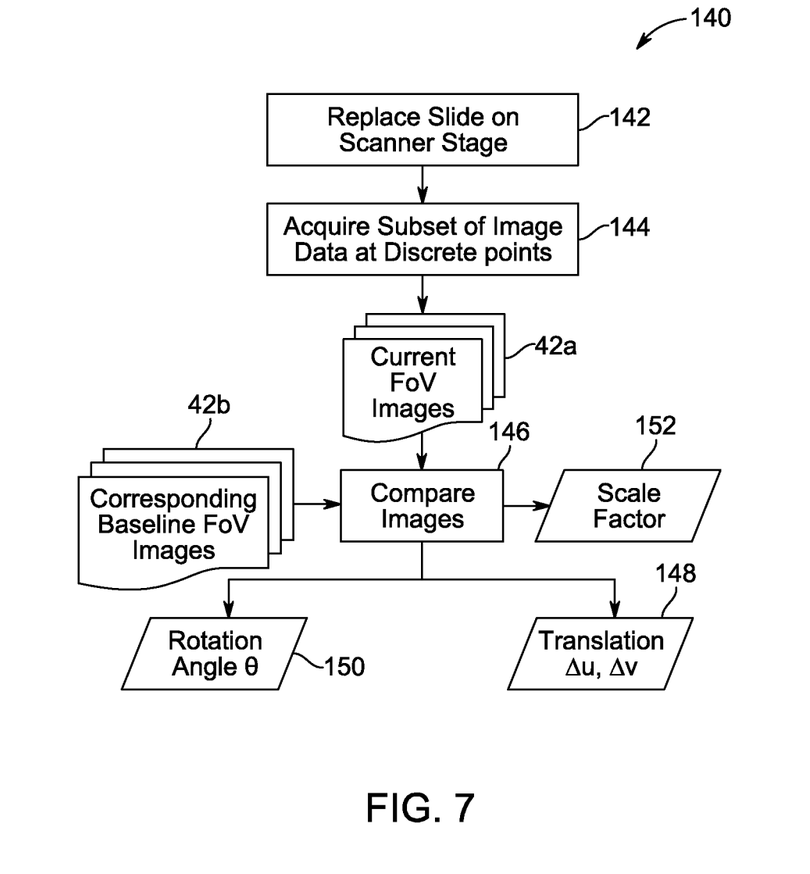
FIG. 7 depicts a flow diagram of steps that may be performed in registering images from a current and baseline round of image acquisition, in accordance with aspects of the present disclosure.

Turning to FIG. 7, the above example may be generalized as illustrated in flowchart 140. In the depicted steps of FIG. 7, a slide 28 is replaced (block 142) on the imaging system stage 22, such as after rinsing off a first set of staining agents and applying a second set of staining agents. A subset of field of view images 42a are acquired (block 144) centered about a limited number of points (e.g., 2 or more, 3 or more, 4 or more, or 5 or more) that are typically set apart with respect to the total area to be imaged (e.g., the sample 24 area). Each of the subset of field of view images 42a are compared (block 146) to the corresponding baseline field of view images 42b. Based on these comparisons, translation (i.e., (Δu, Δv)) 148, rotation (θ) 150, and scale adjustment 152 may be derived with respect to the initial and subsequent image sets. In this manner, the centerpoints of a subset of corresponding field of view images from different imaging rounds may be mapped out and aligned with their respective counterparts to obtain the respective translation of a field of view centerpoint from the baseline round to the current round of imaging. In one embodiment, the alignment operation is performed by correlating the Fourier transforms within log-polar coordinates.

Thus, for each field of view i, a point $(\Delta u_i, \Delta v_i)$ may be characterized that is the offset from the corresponding baseline or initial round field of view. In addition, a rotation θ and scale factor s may also be determined:

$$[u_i^{cur} \ v_i^{cur} \ 1] = [u_i^{base} \ v_i^{base} \ 1] \begin{bmatrix} s\cos\theta & -s\sin\theta & 0 \\ s\sin\theta & s\cos\theta & 0 \\ \Delta u & \Delta v & 1 \end{bmatrix} \quad (15)$$

$$= [u_i^{base} \ v_i^{base} \ 1] M$$

The center of the current field of view image $$\left(\frac{h-1}{2} \; \frac{v-1}{2}\right)$$

maps to $$\left[\frac{(h-1)}{2} \; \frac{(v-1)}{2} \; 1\right] \mathbb{M}^{-1}$$

in the corresponding baseline field of view image or $$\left[\frac{(h-1)}{2} \; \frac{(v-1)}{2} \; 1\right] \mathbb{M}^{-1} \mathbb{C}^{-1}$$

in slide co-ordinates.

Once all points pairs comparisons (e.g., five point pairs in this example) have been computed, the following will be known:

$$(x_1, y_1) \Longrightarrow (x'_1, y'_1) \quad (16)$$
$$(x_2, y_2) \Longrightarrow (x'_2, y'_2)$$
$$\vdots$$
$$(x_5, y_5) \Longrightarrow (x'_5, y'_5)$$

Where $(x_i, y_i)$ is the slide coordinate of the center of field of view i in the baseline round of image acquisition, and $(x'_i, y'_i)$ is the slide coordinate of the corresponding center of field of view i acquired in the current round of image acquisition. Based on this data, a linear transformation may be constructed to solve, for a field of view acquired at $(x, y)$ in the baseline round, what location $[x \; y \; 1] \mathbb{M}^{-1}$ corresponds to the same field of view center in the current round. That is, transformation matrix $\mathbb{M}$ yields, in the least squares sense:

$$[x_i \; y_i \; 1] \cong [x'_i \; y'_i \; 1] \mathbb{M} \quad (17)$$

where $$\mathbb{M} = \begin{bmatrix} m_1 & -m_2 & 0 \\ m_2 & m_1 & 0 \\ m_3 & m_4 & 1 \end{bmatrix}. \quad (18)$$

Expressed as a least squares problem, this becomes:

Minimize $\|\mathbb{A}\mathbb{x} - \mathbb{b}\|_2^2 \quad (19)$ where $$\mathbb{x} = [m_1 \; m_2 \; m_3 \; m_4]^T \quad (20)$$

$$\mathbb{A} = \begin{bmatrix} x'_1 & -y'_1 & 1 & 0 \\ y'_1 & x'_1 & 0 & 1 \\ x'_2 & -y'_2 & 1 & 0 \\ y'_2 & x'_2 & 0 & 1 \\ & \vdots & & \\ x'_n & -y'_n & 1 & 0 \\ y'_n & x'_n & 0 & 1 \end{bmatrix}, \text{ and} \quad (21)$$

$$\mathbb{b} = \begin{bmatrix} x_1 \\ y_1 \\ x_2 \\ y_2 \\ \vdots \\ x_n \\ y_n \end{bmatrix} \quad (22)$$

This transformation matrix provides a set of locations at which to acquire the field of view images 42 in the current imaging round so as to obtain the greatest overlap with the corresponding baseline field of view images. The transformation matrix also provides an estimate of the rotation of the slide 28, and hence of the individual fields of view viewed with respect to the slide 28:

$$\theta = \tan^{-1} \frac{m_2}{m_1}. \quad (23)$$

Based on this auto-alignment procedure, the imaging system 10 can proceed to acquire the full set of field of view images for the current round at the correct locations $[x_i \; y_i \; 1] \mathbb{M}$ which will maximally overlap with the initial or baseline field of view images. In one implementation, once a given field of view image 42 is acquired, the field of view image is rotated by an angle of $-\theta$ (i.e., the pre-computed rotation from the previous step) and registered to the corresponding baseline round field of view image, taking into account translation only. The use of the pre-computed rotation in such an implementation may provide certain benefits, including: 1) being 3× to 5× faster than solving for rotation separately based on the acquired current field of view image and the corresponding field of view image; and 2) the pre-computed rotation is computed over a long baseline (relative to a single field of view image) and is therefore less subject to jitter and unwanted numerical artifacts. The translation ($\Delta u$, $\Delta v$) computed for the registration, the rotation by $\theta$, and the field-of-view transform of the baseline round images compose to yield the field of view transform of the current round of field of view images 42:

$$\mathbb{B}' = \mathbb{B} \cdot \begin{bmatrix} \cos\theta & \sin\theta & 0 \\ -\sin\theta & \cos\theta & 0 \\ \Delta u & \Delta v & 1 \end{bmatrix} \quad (24)$$

With the foregoing in mind, and with respect to stitching the field of view images 42 acquired in a given imaging round to form a composite image 84 for that imaging round, sampling pixel $(U, V)$ of the composite image 84 means sampling pixel $[U \; V \; 1] \cdot \mathbb{C}^{-1} \cdot \mathbb{B}'$ in the respective field of view image 42. Using this relationship, field of view images in subsequent imaging rounds, and composite images generated for those rounds, may be generated that are referenced (i.e., registered) to one another, allowing straightforward comparison of differently stained sample regions, imaged in different image acquisition rounds.

With respect to operational performance, in implementations where fluorescent image acquisitions are performed exposure time may be sufficiently high that the registration of the pre-rotated field of view images in the non-baseline rounds with the corresponding field of view images from the baseline round may overlap with the image acquisition process. Other imaging protocols however (e.g., brightfield imaging) may occur more quickly (i.e., have a shorter exposure time) and might therefore benefit from the use of more specialized processing components (e.g., GPGPU, FPGA, FFT cores, and so forth) to allow overlap between the acquisition steps and registration steps. Further, since the final image coordinates are known after the registration step, in certain implementations stitching of the field of view images 42 to form a composite image 84 could also overlap the scan in non-baseline image acquisition rounds. In such an implementation, the scan process may acquire field of view images in Y-direction order and may employ logic to consider the maximum Y displacement of a field of view so as to determine when it is permissible to begin blending a given scan line.

Further, it may be noted that in the auto-alignment procedure discussed herein, while the disclosed log-polar fast Fourier transform operation can deal with scale as well as translation and rotation, the range of scales for which this operation is suitable may be narrow (e.g., a factor of 2). Therefore, in implementations where images are to be registered that are acquired with different microscope objectives (i.e., at different magnifications), it may be useful to perform the auto-alignment procedure at the same magnification. Alternatively, the higher magnification image may be decimated and a windowing function applied. The resulting image may be zero-padded to the size of the lower magnification image, adjusting the image transform matrix to compensate for the translation and scaling that result.

Technical effects of the invention include images acquired over multiple fields of view to be fused into a single large image of a slide and provides pixel-precise alignment of the images acquired during one round of imaging with the images acquired during other rounds of imaging. The pixel-precise registration is accomplished despite uncertainty associated with slide placement, runout and misalignment of the stage, nonorthogonality of the stage axes, misalignment of the camera to the stage, and cylindrical distortion in the optical train.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for registering images, comprising:
    acquiring a first set of images of a sample on a slide positioned on a stage, wherein each image is taken at a different field of view;
    generating a global transformation matrix by registering the images of the first set to one another to form a composite image;
    acquiring a subset of images of the sample on the slide after the slide is removed from and replaced on the stage, wherein the subset of images is less than the number of images in the first set;
    registering each image of the subset with a corresponding image of the first set of images to determine a translation, a rotation, and a scale factor;
    acquiring a second set of images of the sample at the same respective fields of view used to acquire the first set of images;
    rotating and scaling each image of the second set of images using the rotation and the scale factor determined for the subset of images; and
    registering the rotated and scaled images of the second set to the corresponding images of the first set.

2. The computer-implemented method of claim 1, wherein each image of the first set of images overlaps one or more respective adjacent images of the first set.

3. The computer-implemented method of claim 1, wherein the first set of images and the second set of images are taken over a uniform grid of spatial locations.

4. The computer-implemented method of claim 1, wherein the first set of images, the subset of images, and the second set of images are acquired using a digital microscopy system.

5. The computer-implemented method of claim 1, wherein the sample is differently stained before being replaced on the stage.

6. The computer-implemented method of claim 1, wherein the global transformation matrix maps coordinates from a slide on which the sample is disposed to both the composite image and the respective individual images of the first set.

7. The computer-implemented method of claim 1, wherein each image of the subset is registered with the corresponding image of the first set of images using a log-polar fast Fourier transform.

8. The computer-implemented method of claim 1, wherein registering the rotated and scaled images of the second set to the corresponding images of the first set comprises translating the rotated and scaled images of the second set without additional rotation or scaling.

9. An image analysis system, comprising:
    a memory storing one or more routines; and
    a processing component configured to execute the one or more routines stored in the memory, wherein the one or more routines, when executed by the processing component, cause acts to be performed comprising:
    performing an alignment operation between a limited set of images acquired of a sample and a previously acquired full set of images of the sample wherein the limited set of images comprise fewer images than the full set of images, wherein the alignment operation generates at least a rotation relating the limited set of images to corresponding images of the full set of images;
    rotating a subsequently acquired full set of images by the rotation; and
    translating the rotated images of the subsequently acquired full set of images to register the rotated images with corresponding images of the previously acquired full set of images.

10. The image analysis system of claim 9, wherein the limited set of images comprises 3, 4, or 5 images of the sample.

11. The image analysis system of claim 9, wherein the alignment operation comprises a log-polar fast Fourier transform.

12. The image analysis system of claim 9, wherein the alignment operation also generates a scale factor and wherein the subsequently acquired full set of images is scaled by the scale factor prior to translation.

13. The image analysis system of claim 9, wherein each image of the subsequently acquired full set of images corresponds to a respective image of the previously acquired full set of images.

14. The image analysis system of claim 9, wherein the one or more routines, when executed by the processing component, cause further acts to be performed comprising:
generating and displaying at least one composite image from the previously acquired full set of images or the subsequently acquired full set of images.

15. A digital microscopy imaging system, comprising:
a stage configured to hold a slide;
an objective lens and image sensor configured to acquire images of a portion of the slide, when present;
a position controller configured to move one or both of the objective lens and the stage relative to one another in accordance with an imaging protocol;
a controller configured to control operation of one or both of the position controller and the image sensor;
a memory storing one or more routines; and
a processing component configured to execute the one or more routines stored in the memory, wherein the one or more routines, when executed by the processing component, cause acts to be performed comprising:
acquiring a first full set of images of at least a portion of the slide, wherein each image overlaps with at least one adjacent image;
acquiring a second full set of images of at least the portion of the slide after the slide is removed from and replaced on the stage;
rotating the images of the second full set of images by a predetermined angle to generate a set of pre-rotated images; and
translating the pre-rotated images to register the pre-rotated images to corresponding images of the first full set of images.

16. The digital microscopy imaging system of claim 15, wherein the first and the second full sets of images are acquired over a uniform grid.

17. The digital microscopy imaging system of claim 15, wherein the one or more routines, when executed by the processing component, cause further acts to be performed comprising:
scaling the images of the second full set of images by a predetermined scale factor prior to translating the pre-rotated images.

18. The digital microscopy imaging system of claim 15, wherein the one or more routines, when executed by the processing component, cause further acts to be performed comprising:
acquiring a limited set of images of the slide after the slide is remove from and replaced on the stage; and
calculating the predetermined angle by registering the limited set of images to corresponding images in the first full set of images.

19. The digital microscopy system of claim 18, wherein the limited set of images comprises 3, 4, or 5 images.

20. The digital microscopy system of claim 18, wherein the predetermined angle is calculated using a log-polar fast Fourier transform.

* * * * *